(12) United States Patent
Stupar et al.

(10) Patent No.: US 9,749,152 B2
(45) Date of Patent: Aug. 29, 2017

(54) APPARATUS AND METHOD FOR ALLOCATING DATA FLOWS BASED ON INDICATION OF SELECTION CRITERIA

(75) Inventors: Patrick Stupar, Nuremberg (DE); Gerardo Giaretta, San Diego, CA (US); Ramaswamy Venkateshwaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 12/987,901

(22) Filed: Jan. 10, 2011

(65) Prior Publication Data

US 2011/0188376 A1 Aug. 4, 2011

Related U.S. Application Data

(60) Provisional application No. 61/295,581, filed on Jan. 15, 2010.

(51) Int. Cl.
*H04L 12/54* (2013.01)
*H04W 76/02* (2009.01)
(Continued)

(52) U.S. Cl.
CPC ..... *H04L 12/5692* (2013.01); *H04W 28/0268* (2013.01); *H04W 48/18* (2013.01);
(Continued)

(58) Field of Classification Search
CPC ......... H04W 36/0022; H04W 36/0033; H04W 36/0044; H04W 88/06
(Continued)

(56) References Cited

U.S. PATENT DOCUMENTS 6,965,948 B1 11/2005 Eneborg et al.
8,145,210 B2 * 3/2012 Thalanany et al. ........ 455/432.1
(Continued)

FOREIGN PATENT DOCUMENTS

CN 101207900 A 6/2008
CN 101505524 A 8/2009
(Continued)

OTHER PUBLICATIONS

3rd Generation Partnership Project, Technical Specification Group Core Network and Terminals, 3GPP System Architecture Evolution, CT WG1 Aspects (Release 8), 3GPP Standard, 3GPP TR 24.801, 3rd Generation Partnership Project (3GPP), Mobile Competence Centre, 650, Route Des Lucioles, F-06921 Sophia-Antipolis Cedex, France, No. V8.1.0, Dec. 1, 2008 (Dec. 1, 2008), pp. 1-215, XP050365687.
(Continued)

*Primary Examiner* — Yaotang Wang

(57) ABSTRACT

An apparatus and method for allocating a data flow based on selection criteria including receiving at least one policy including at least one indication for selecting an access from two or more of available accesses; determining a selection criterion based on the data flow; and selecting the access based on the determined selection criterion and the at least one indication. In one example, the selection criterion is one of the following: a bandwidth requirement for the data flow, an application generating the data flow, a protocol used to carry the data flow, a file size, an application name/ID, a role ID, or a throughput of the data flow. In one example, the policy is a management object (MO) received from an Access Network Discovery and Selection Function (ANDSF) module and the selected access is for a wireless local area network (WLAN), a LTE network or for a 3GPP service.

23 Claims, 8 Drawing Sheets

(51) Int. Cl.
  *H04W 28/02* (2009.01)
  *H04W 28/08* (2009.01)
  *H04W 48/18* (2009.01)
  *H04W 88/06* (2009.01)

(52) U.S. Cl.
  CPC ......... *H04W 76/025* (2013.01); *H04W 88/06* (2013.01); *H04W 28/08* (2013.01)

(58) Field of Classification Search
  USPC ............ 370/235, 254; 455/432.1, 433, 426.1
  See application file for complete search history.

(56) References Cited

U.S. PATENT DOCUMENTS

| | | | |
|---|---|---|---|
| 2006/0129630 A1* | 6/2006 | Catalina-Gallego | H04L 29/12311 709/203 |
| 2007/0297378 A1* | 12/2007 | Poyhonen | H04W 48/18 370/338 |
| 2008/0084819 A1* | 4/2008 | Parizhsky | H04L 47/10 370/230 |
| 2008/0311912 A1 | 12/2008 | Balasubramanian et al. | |
| 2009/0088188 A1* | 4/2009 | Wormald | H04W 4/18 455/466 |
| 2009/0170555 A1* | 7/2009 | Olvera-Hernandez et al. | 455/552.1 |
| 2009/0291704 A1* | 11/2009 | Korus et al. | 455/519 |
| 2010/0034166 A1* | 2/2010 | Olvera-Hernandez | H04W 36/24 370/331 |
| 2010/0296415 A1* | 11/2010 | Sachs et al. | 370/254 |
| 2011/0014892 A1* | 1/2011 | Hedman | H04W 4/22 455/404.2 |
| 2011/0044253 A1* | 2/2011 | Zisimopoulos | 370/328 |
| 2011/0065424 A1* | 3/2011 | Estevez et al. | 455/414.3 |
| 2011/0110300 A1* | 5/2011 | Sachs et al. | 370/328 |
| 2011/0128907 A1* | 6/2011 | Kvernvik | H04L 12/5691 370/328 |
| 2011/0171953 A1* | 7/2011 | Faccin et al. | 455/426.1 |
| 2011/0317571 A1* | 12/2011 | Kokkinen et al. | 370/252 |
| 2012/0264412 A1* | 10/2012 | Tervonen et al. | 455/418 |

FOREIGN PATENT DOCUMENTS

| | | |
|---|---|---|
| CN | 101568163 A | 10/2009 |
| EP | 2169976 A1 | 3/2010 |
| EP | 2237610 A1 * | 10/2010 |
| GB | 2457656 A | 8/2009 |
| JP | 2000510303 A | 8/2000 |
| JP | 2003514442 A | 4/2003 |
| JP | 2004179693 A | 6/2004 |
| JP | 2005078220 A | 3/2005 |
| JP | 2006054841 A | 2/2006 |
| JP | 2009232182 A | 10/2009 |
| WO | WO-0135585 A1 | 5/2001 |
| WO | 2009001714 A1 | 12/2008 |
| WO | 2009029156 A1 | 3/2009 |
| WO | WO 2009100676 A1 * | 8/2009 |
| WO | WO-2009127276 A1 | 10/2009 |

OTHER PUBLICATIONS

3rd Generation Partnership Project, Technical Specification Group Core Network and Terminals, Access to the 3GPP Evolved Packet Core (EPC) via non-3GPP access networks, Stage 3, (Release 9), 3GPP Standard, 3GPP TS 24.302, 3rd Generation Partnership Project (3GPP), Mobile Competence Centre, 650, Route Des Lucioles, F-06921 Sophia-Antipolis Cedex, France, No. V9.1.1, Dec. 21, 2009 (Dec. 21, 2009), pp. 1-54, XP050401495, [retrieved on Dec. 21, 2009].

International Search Report and Written Opinion—PCT/US2011/021413—ISA/EPO—Apr. 15, 2011.

Universal Mobile Telecommunications System (UMTS), LTE, Access Network Discovery and Selection Function (ANDSF) Management Object (MO) (3GPP TS 24.312 version 8.2.0 Release 8 ), Technical Specification, European Telecommunications Standards Institute (ETSI), 650, Route Des Lucioles, F-06921 Sophia-Antipolis, France, No. V8.2.0, Jun. 1, 2009 (Jun. 1, 2009), XP014044561.

"3rd Generation Partnership Project; Technical Specification Group Core Network and Terminals; Access Network Discovery and Selection Function (ANDSF) Management Object (MO); (Release 8)", 3GPP TS 24.312 V8.0.0, Dec. 2008, pp. 1-36.

Taiwan Search Report—TW100101587—TIPO—Jul. 17, 2013.

* cited by examiner

APPARATUS AND METHOD FOR ALLOCATING DATA FLOWS BASED ON INDICATION OF SELECTION CRITERIA

CLAIM OF PRIORITY UNDER 35 U.S.C. §119

The present application for patent claims priority to Provisional Application No. 61/295,581 entitled "Method and System for Allocating Data Flows Based on Indication of Bandwidth Requirements" filed Jan. 15, 2010, and assigned to the assignee hereof and hereby expressly incorporated by reference herein.

FIELD

This disclosure relates generally to apparatus and methods for wireless communication. More particularly, the disclosure relates to allocating data flows based on indication of selection criteria.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) system and a frequency division duplex (FDD) system. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed is an apparatus and method for allocating data flows based on indication of selection criteria. According to one aspect, a method for allocating a data flow based on selection criteria includes the following: receiving at least one policy that includes at least one indication for selecting an access from two or more of available accesses; determining a selection criterion based on the data flow; and selecting the access based on the determined selection criterion and the at least one indication.

According to another aspect, disclosed is an apparatus (or device) for allocating a data flow based on selection criteria. The apparatus includes means for receiving at least one policy. The policy may include at least one indication for selecting an access from two or more of available accesses. The apparatus further includes means for determining a selection criterion based on the data flow and means for selecting the access based on the determined selection criterion and the at least one indication.

According to another aspect, disclosed is an apparatus for allocating a data flow based on selection criteria which includes a transceiver for receiving at least one policy including at least one indication for selecting an access from two or more of available accesses, and a processor for determining a selection criterion based on the data flow and for selecting the access based on the determined selection criterion and the at least one indication.

According to another aspect, disclosed is a non-transitory computer-readable medium which includes program code stored thereon. The program codes may include program code for receiving at least one policy including at least one indication for selecting an access from two or more of available accesses, program code for determining a selection criterion based on the data flow, and program code for selecting the access based on the determined selection criterion and the at least one indication.

Advantages of the present disclosure may include increased efficiency in data flow allocation and improving throughput for data flows.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
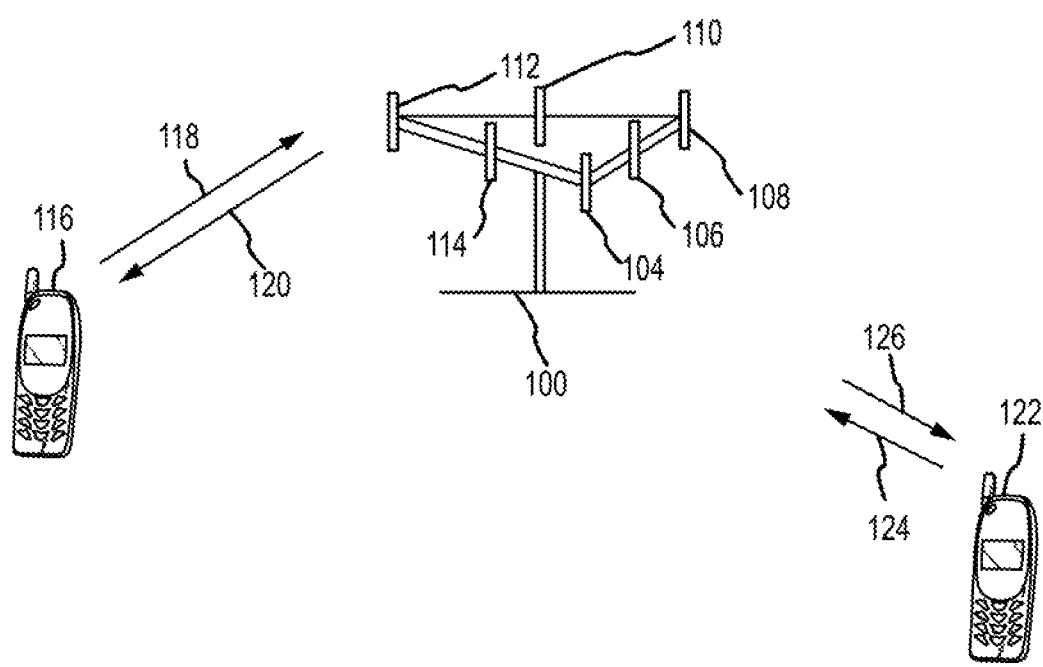
FIG. 1 illustrates an example of a multiple access wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Time Division Synchronous Code Division Multiple Access (TD-SCDMA) (a.k.a. Low Chip Rate (LCR)). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalizations has similar performance and may have essentially the same overall complexity as those of an OFDMA system. A SC-FDMA signal may have lower peak-to-average power ratio (PAPR) because of its inherent single carrier structure. SC-FDMA may be utilized in uplink communication where lower PAPR may benefit the mobile terminal in terms of transmit power efficiency.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may each use a different frequency for communication. For example, forward link 120 may use a different frequency than that used by reverse link 118.

Each group of antennas and/or the area in which they are designed to communicate may be referred to as a sector of the access point. In one aspect, antenna groups are each designed to communicate with access terminals in a sector of the areas covered by access point 100.

In communication over forward links 120 and 126, the transmitting antennas of access point 100 may utilize beamforming to improve the signal-to-noise ratio of forward links for the different access terminals 116 and 122. Also, an access point may use beamforming to transmit to access terminals scattered randomly through its coverage area which may cause less interference to access terminals in neighboring cells than an access point transmitting through a single antenna to all its access terminals.

An access point may be a fixed station used for communicating with the terminals and may also be referred to as an access point, a Node B, eNodeB or some other terminology. An access terminal may also be called a mobile terminal, a user equipment (UE), a wireless communication device, a terminal, a user terminal or some other terminology.

Figure 2:
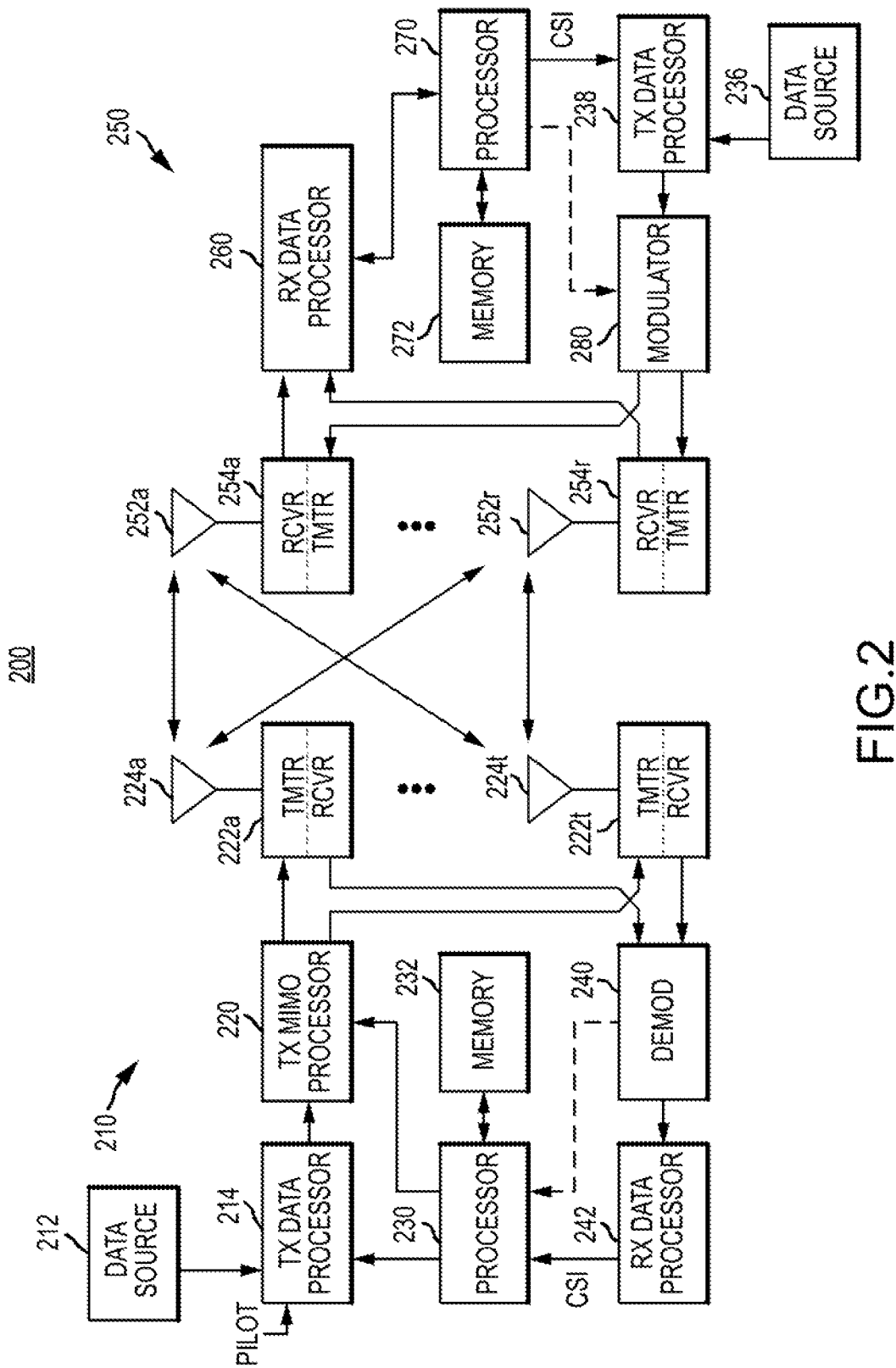
FIG. 2 illustrates an example block diagram of a transmitter system (also known as the access point) and a receiver system (also known as an access terminal).

FIG. 2 illustrates an example block diagram of a transmitter system 210 (also known as the access point) and a receiver system 250 (also known as an access terminal). At the transmitter system 210 traffic data for a number of data streams is provided from a data source 212 to a transmit (TX) data processor 214.

In one aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use Processor 270 formulates a reverse link message including a matrix index portion and a rank value portion.

The reverse link message may include various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information, and/or a Multicast Control Channel (MCCH) which is a point-to-multipoint DL channel used for transmitting Multimedia Broadcast and Multicast Service (MBMS) scheduling and control information for one or several Multicast Traffic Channels (MTCHs). Generally, after establishing an RRC connection, MCCH may only be used by UEs that receive MBMS (Note: old MCCH+MSCH). A Dedicated Control Channel (DCCH) is a point-to-point bi-directional channel that transmits dedicated control information and used by UEs having an RRC connection. In one aspect, Logical Traffic Channels may include a Dedicated Traffic Channel (DTCH) which is a point-to-point bi-directional channel, and is dedicated to one UE, for the transfer of user information. Also, a Multicast Traffic Channel (MTCH) may be used for a point-to-multipoint DL channel for transmitting traffic data.

In one aspect, Transport Channels are classified into downlink (DL) and uplink (UL) channels. DL Transport Channels may include a Broadcast Channel (BCH), Downlink Shared Data Channel (DL-SDCH) and a Paging Channel (PCH). The PCH is used for support of UE power saving (e.g., a DRX cycle is indicated by the network to the UE), broadcasted over an entire cell and mapped to PHY resources which can be used for other control/traffic channels. The UL Transport Channel may include a Random Access Channel (RACH), a Request Channel (REQCH), a Uplink Shared Data Channel (UL-SDCH) and a plurality of PHY channels. The PHY channels may include a set of DL channels and UL channels.

In one aspect, the DL PHY channels may include one or more of the following:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator. Channel (LICH)
  In one aspect, the UL PHY channels may include one or more of the following:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

In one aspect, a channel structure is provided that preserves low PAPR (at any given time the channel is contiguous or uniformly spaced in frequency) properties of a single carrier waveform.

Figure 3:
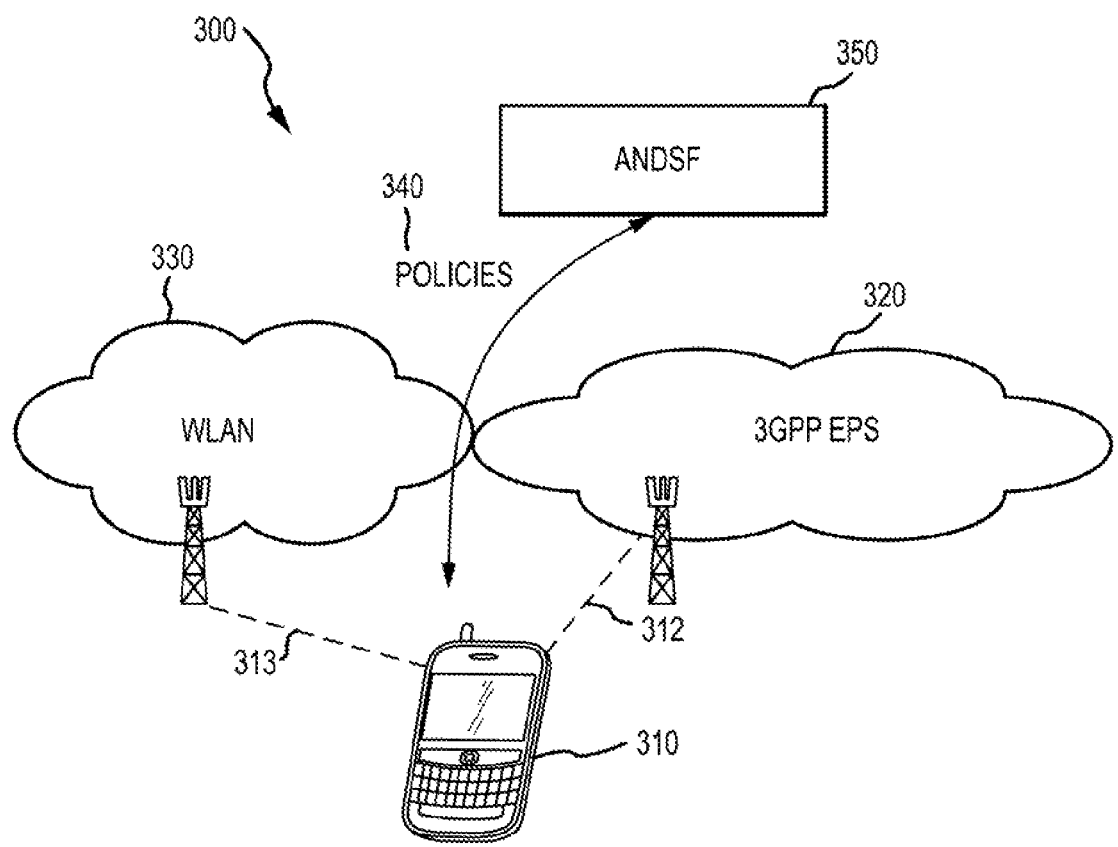
FIG. 3 illustrates an example of an Evolved Packet System (EPS).

In one aspect, the present disclosure discloses allocating different Internet Protocol (IP) flows among available accesses (also referred to herein as networks, interfaces, network accesses, access points, access nodes, etc.) based on an indication of selection criteria of a user equipment (UE). FIG. 3 illustrates an example of an Evolved Packet System (EPS). For example, with reference to an example system 300 shown in FIG. 3, a 3rd Generation Partnership Project (3GPP) Evolved Packet System (EPS) network has the UE 310 connected to both a LTE (3GPP EPS) network 320 and a Wireless Local Area Network (WLAN) 330 via a first access 312 and a second access 313, respectively. The UE 310 may be provided with policies 340 indicating how to distribute the data flows (e.g., IP flows) between the two accesses 312, 313. One skilled in the art would understand that although two accesses are described, the present disclosure is not limited to two accesses and that other quantity of accesses may be used without affecting the scope or spirit of the present'disclosure.

In one example, the components or modules of the network providing the policies 340 may include an Access Network Discovery and Selection Function (ANDSF) entity or module 350. In one example, the communication protocol between the ANDSF 350 and the UE 310 may utilize an Open Mobile Alliance Device Management (OMA-DM) protocol or the like. Based on OMA-DM specifications, the information exchanged by the UE 310 and the ANDSF 350 may be defined in a Management Object (MO). For example, the MO for ANDSF-UE communication may be specified in the 3GPP Technical Specification TS24.312 or the like.

In one aspect, the policies for distributing a data flow (e.g., an IP flow) among a plurality of accesses may indicate to the UE which access should be used for certain data flows described in terms of media type, IP source address, IP destination address, source port, destination port or protocol type, etc. For example, the ANDSF may indicate to the UE that the WLAN should be used for traffic with destination port 80, such that Hypertext Transfer Protocol (HTTP) traffic may be exchanged via the WLAN. In one aspect, the protocols of the Transport Layer of the IP Suite, for example, the Transmission Control Protocol (TCP), the User Datagram Protocol (UDP), etc., may use a numerical identifier for the data structures of the endpoints for host-to-host communications. Such an endpoint is known as a port (a.k.a. a connection port or a destination port, etc.) and the identifier is the port number. For example, port 21 typically refers to a FTP traffic connection. For example, destination port 80 refers to an HTTP traffic connection.

In one aspect, the indication to the UE regarding which access to use (e.g., the first access 312 to the LTE (3GPP EPS) network 320 or the second access 313 to the WLAN 330) may be based at least in part on the bandwidth required by a given data flow (e.g., IP flow). In one example, the ANDSF may communicate to the UE to allocate a data flow on a specific access based on the amount of bandwidth required by the data flow. Such'indications may include stand-alone information or may be used together with other details and criteria.

In one example, the ANDSF may instruct the UE to use WLAN for all the data flows that utilize more than (or less than) a defined amount of a network resource, such as a bandwidth utilization that exceeds 10 kbit/s, such that the information regarding which access the UE uses is related to a consumed bandwidth. In another example, the ANDSF may instruct the UE to use WLAN for all the data flows with destination port 80 that allocate more than a defined parameter, such as a bandwidth that exceeds 9 kbits, such that the information regarding which access the UE uses for the data flow is related to the consumed bandwidth and based on the application generating the data flow. In yet another example, the ANDSF may instruct the UE to use a particular access based on the application run on the UE. In one aspect, the operator may provide an indication about the allowed throughput for each data flow that a UE may use on a specific access. In one aspect, the proposed techniques described herein may be implemented by adding additional information in the MO defined for ANDSF, such as, for example, in 3GPP TS 24.312 or the like.

In another example, the ANDSF may instruct the UE to select an access for a data flow based on one criterion among a plurality of selection criteria. For example, a policy for a bandwidth criterion may be specified as described earlier. For example, a policy for a file size criterion may indicate that if a file size of, a transaction is above (or below) a given size threshold, then a given access should be used for the data flow. In one example, this file size criterion may be useful in podcast downloads where a protocol allows for file size negotiation or indication before an actual download. For example, a policy for an application name/ID criterion may indicate that all traffic generated by a given application (e.g. identified by a name or an ID) should be routed through a given access. In another example, a policy for a role ID criterion may manifest itself as a Voice over IP stream (VoIP) or a video stream and the policy may be specified accordingly. As yet another example, a policy which is a combination of any of the above described policies may also be specified. One skilled in the art would understand that the examples of the policy described herein are not exclusive and that other examples for the policy may be used without affecting the spirit or scope of the present application.

Although the above examples are described using data flows, one skilled in the art would understand that the context of data flow is intended to be given its broadest possible meaning, for example, data flow may include but is not limited to an IP flow, a streaming data flow, a file transfer flow, a messaging flow, etc.

Figure 4:
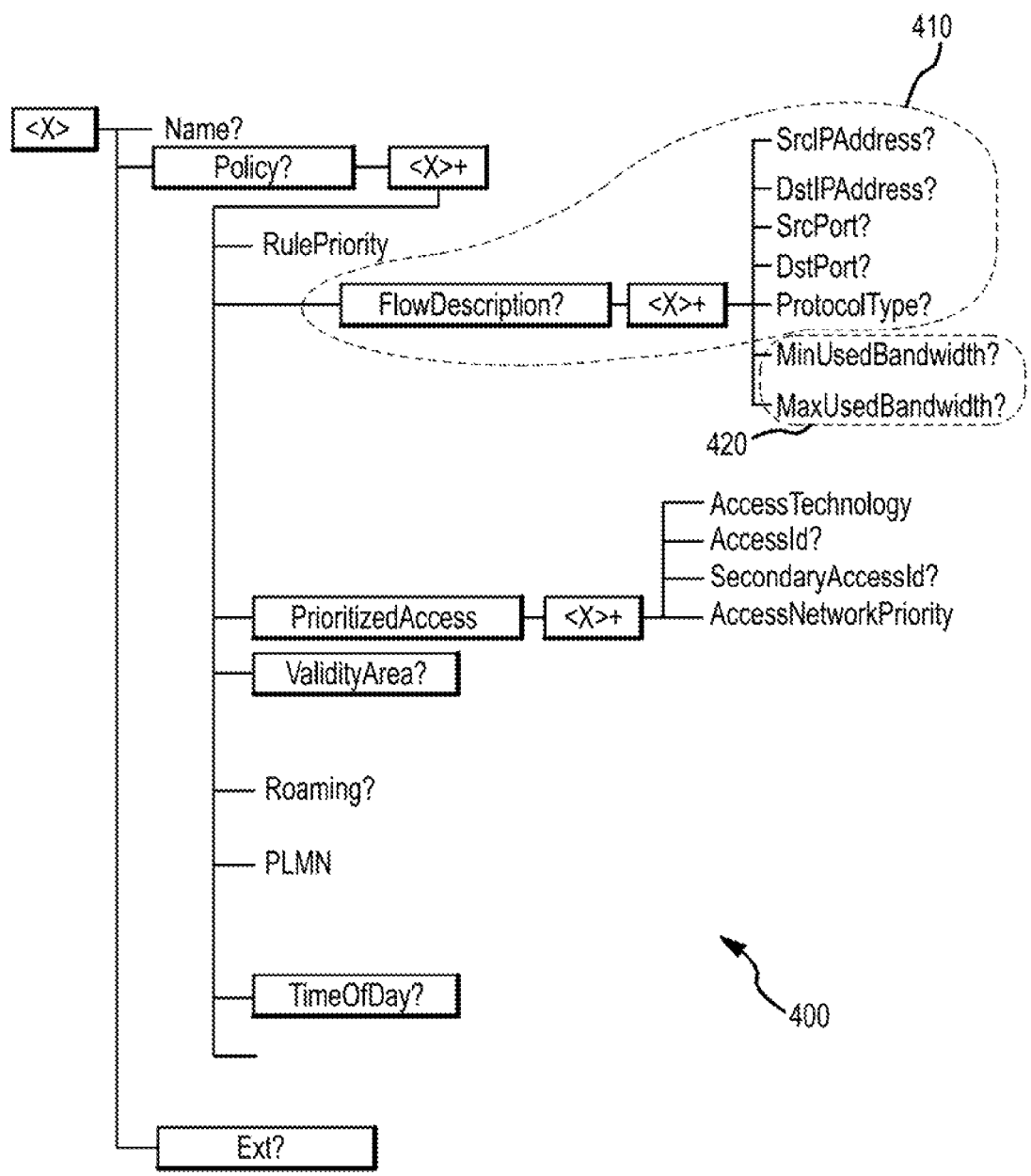
FIG. 4 illustrates, an example of a Management Object (MO) of an Access Network Discovery and Selection Function (ANDSF) entity.

FIG. 4 illustrates an example of a Management Object (MO) of an Access Network Discovery and Selection Function (ANDSF) entity. In accordance with aspects of the proposed disclosure herein, the example ANDSF and MO may be used for implementing allocations of data flows based on selection criteria. With reference to FIG. 4, for example, the ANDSF MO 400 may include a plurality of nodes (which may also be known as "leaves" or "leaf"). In one example, the ANDSF MO 400 is a data structure with a set of data objects organized in the data structure. FIG. 4 shows examples of information that the ANDSF entity provides to a user equipment (UE) as part of an indication sent by the ANDSF entity to the UE. An example of the information may include a flow description which is a set of information for identifying traffic generated by the UE for which a policy will apply. Node 410 (a.k.a. leaf 410) lists examples of information for identifying the traffic generated by the UE, including but not limited to, Source IP address, Destination IP address, Source port, Destination port, Protocol type, etc. Node 420 (a.k.a. leaf 420) (e.g., Minimum used bandwidth, Maximum used bandwidth, etc.) lists corresponding information which may be used to implement the allocation of data flows based on selection criteria. In one example, the information in Node 420 may also include a file size, an application name/ID or a role ID. For the sake of simplicity, some of the nodes (or leaves) are not shown or discussed herein as their functions may be peripheral to the allocation of data flows based on selection criteria. The term priority access represents a ranking of the priority associated with the access to be used by the UE. Information to be used for ranking the priority may include access technology, access ID, secondary access ID or access network priority, etc. The term validity area represents a set of information used by the UE to determine when a policy received, for example from the ANDSF entity, should apply. Information in the validity area may include location information, roaming information, Public Land Mobile Network (PLMN) information, time of day information, etc.

Figure 5:
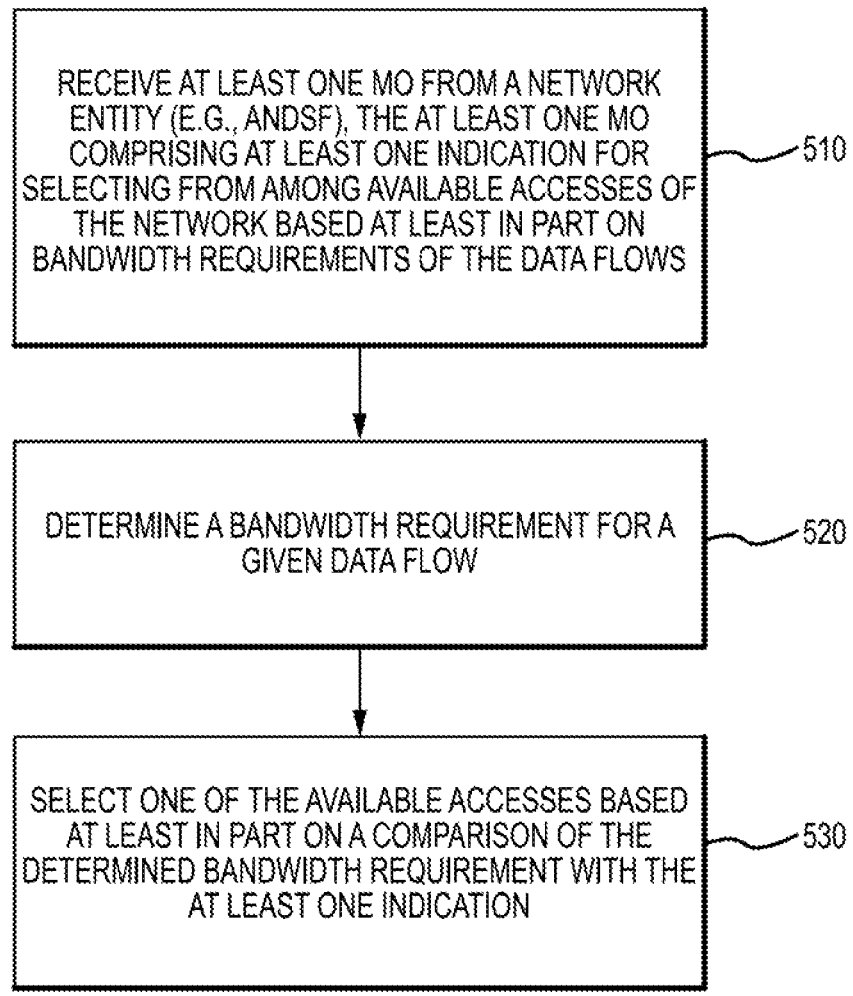
FIG. 5 illustrates a first example flow diagram for allocating data flows based on selection criteria.

FIG. 5 illustrates a first example flow diagram 500 for allocating data flows, for example in a wireless communication network based at least in part on a selection criteria. In one example, one or more of the selection criteria is one or more of the following: a data flow bandwidth requirement, a file size, an application name/ID or a role ID. In yet another example, the selection criteria is a combination of the examples listed above. In block 510, at least one management object (MO) from a network entity (e.g., ANDSF) is received. The at least one MO may include at least one indication for selecting from among available accesses (e.g., WLAN, 3GPP, etc.) of the network based at least in part on certain resource requirements of the data flows, e.g., bandwidth requirements. In one example the indication may instead reference an application that generates the data flow, etc.

In one example, the at least one indication may indicate to the UE to use a given access (e.g., WLAN) for data flows that allocate more than a defined parameter, such as a bandwidth that exceeds 10 Kbit/s. In another example, the at least one indication may indicate to the UE to use a given access for data flows that are generated by a particular application or transmitted over a particular protocol (e.g., destination port 80) and a consumed bandwidth (e.g., more than 10 kbit/s). In yet another example, the indication may indicate the allowed throughput for each data flow that a UE may assign on a specific access.

Following block 510, in block 520, a bandwidth requirement for a given data flow may be determined. In block 530, one of the available accesses may be selected based at least in part on a comparison of the determined bandwidth requirement with the at least one indication. In one aspect, one or more of the steps in FIG. 5 is performed by a user equipment or component(s) in an user equipment.

Figure 6:
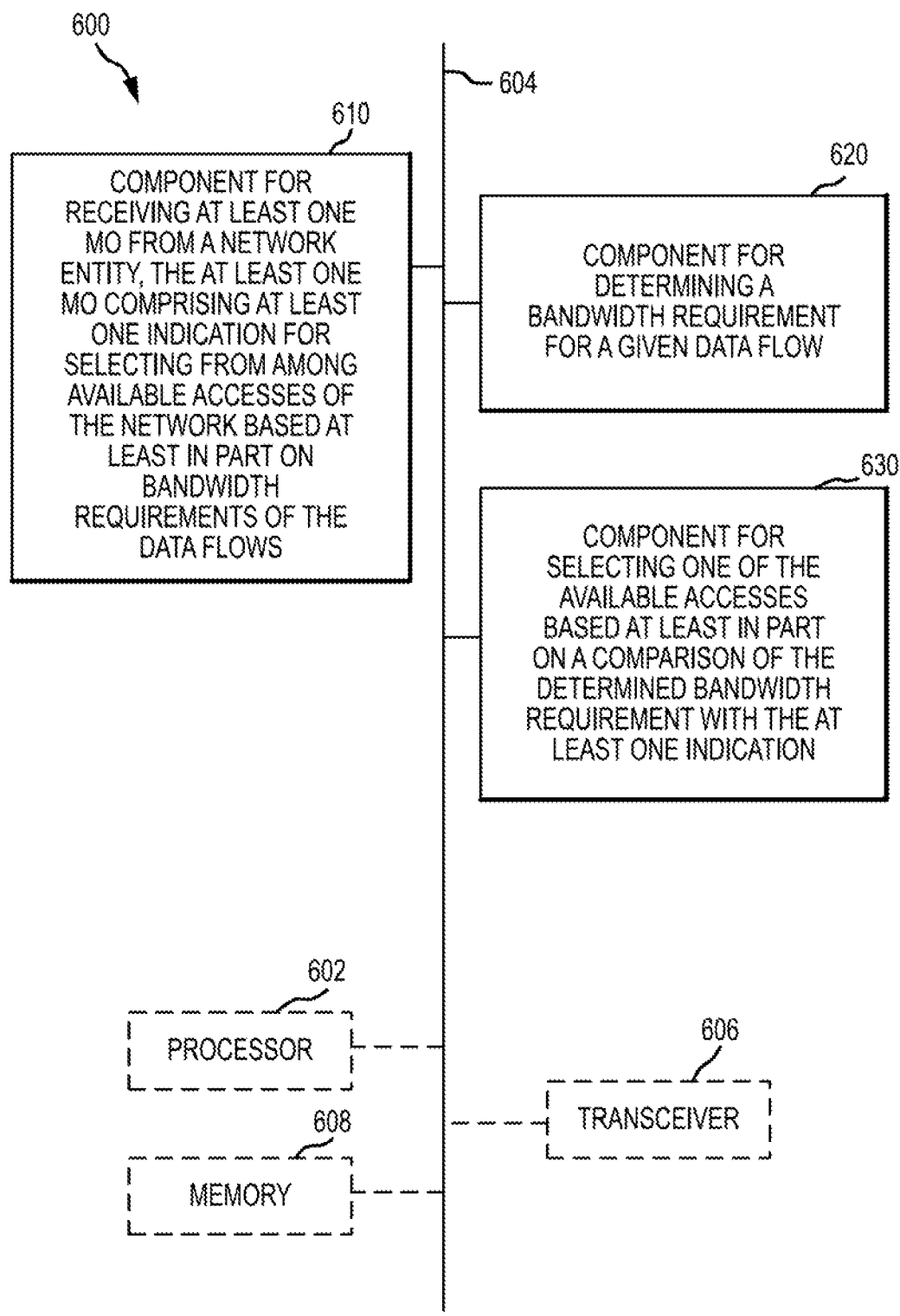
FIG. 6 illustrates a first example device for allocating data flows based on selection criteria.

FIG. 6 illustrates a first example device 600 for allocating data flows, for example in a wireless communication network based at least in part on data flow selection criteria. In one example, one of the selection criteria is the data flow bandwidth requirement. The device 600 may be configured as a communication device or similar device for use within the communication device. As depicted, device 600 may include functional blocks that can represent functions implemented by a processor, software, hardware or combination thereof (e.g., firmware).

As illustrated, device 600 may include an electrical component 610 for receiving at least one'MO from a network entity, wherein the at least one MO includes at least one indication for selecting from among available accesses of the network based at least in part on bandwidth requirements of the data flows. The device 600 may include an electrical component 620 for determining a bandwidth requirement (or some other network resource requirement, e.g., a file size application) of a given data flow or some other attribute of the data flow, such as the application generating the data flow, the amount of data (e.g., file size contained in the data flow), etc. The device 600 may include an electrical component 630 for selecting one of the available accesses based at least in part on a comparison of the determined bandwidth requirement (or other network resource requirement) with the at least one indication. In one example, one or more processors may be used for performing the functions of device 600.

Device 600 may optionally include a processor module 602 having at least one processor. In one aspect, device 600 may be configured as a communication network entity, rather than as a processor. Processor 602, in such case, may be in operative communication with electrical components 610-630 via a bus 604 or a similar communication coupling. Processor 602 may effect initiation and scheduling of the processes or functions performed by electrical components 610-630.

In related aspects, device 600 may include a transceiver module 606. A stand-alone receiver and/or stand-alone transmitter may be used in lieu of or in conjunction with transceiver module 606. In further related aspects, device 600 may optionally include a module for storing information, such as, for example, a memory module 608. The memory module 608 may include a computer readable medium and may be operatively coupled to the other components of device 600 via a bus 604 or the like. The memory module 608 may be adapted to store computer readable codes, instructions and/or data for effecting the processes and behavior of electrical components 610-630, and sub-components thereof, or processor 602, or the methods disclosed herein. Memory module 608 may retain codes/instructions for executing functions associated with electrical components 610-630. While shown as being external to memory module 608, it is to be understood that electrical components 610-630 may exist within memory module 608.

Figure 7:
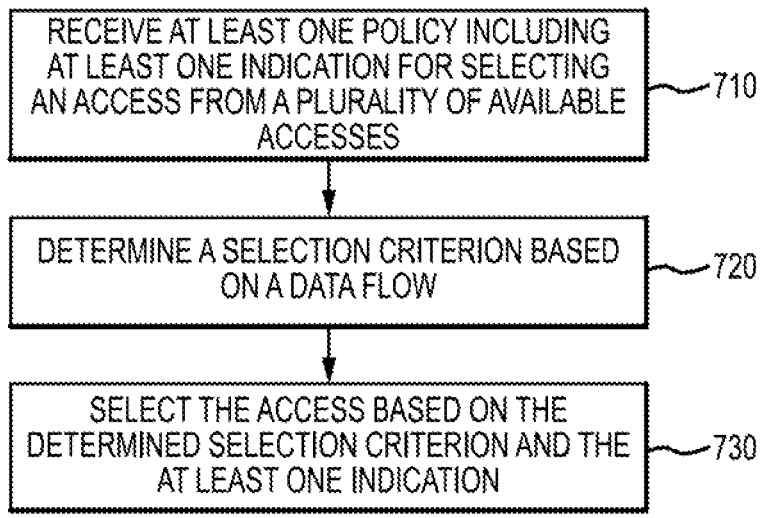
FIG. 7 illustrates a second example flow diagram for allocating data flows based on selection criteria.

FIG. 7 illustrates a second example flow diagram for allocating data flows based for example in part on selection criteria. In block 710, at least one policy may be received wherein the policy includes at least one indication for selecting an access from a plurality of available accesses. In one example, the policy is a management object (MO). In one example, the policy is received from a network entity. In one example, the network entity is an Access Network Discovery and Selection Function (ANDSF) module. In one example, the access is for a wireless local area network (WLAN), for an LTE network, or for a 3GPP service. In one example, the at least one indication indicates which access to use for data flows that utilize an allocation greater than a defined value of data rate. In another example, the at least one indication indicates which access to use for data flows that are generated by a particular type of application, utilize a particular protocol or consume a certain amount of bandwidth. In another example, the at least one indication indicates which access to use based on an allowed throughput for each of the data flows. In block 720, a selection criterion may be determined based on a data flow. In one example, the selection criterion may be one of the following: a bandwidth requirement for a data flow, an application generating the data flow or traffic, a protocol used to carry the data flow, a file size, an application name/ID, a role ID, or a throughput of the data flow.

One skilled in the art would understand that bandwidth requirement for a data flow may depend on various factors, such as but not limited to application, usage, data type, design choice, user choice, etc. without affecting the scope or spirit of the present disclosure. Thus, how bandwidth requirements are determined may differ accordingly. In block 730, the access may be selected based on the determined selection criterion and the at least one indication. In one aspect, one or more of the steps in FIG. 7 is performed by a user equipment or component(s) in an user equipment. In one example, the step in block 710 may be performed by a transceiver or a receiver; and, the steps in blocks 720 and 730 may be performed by one or more processors.

Figure 8:
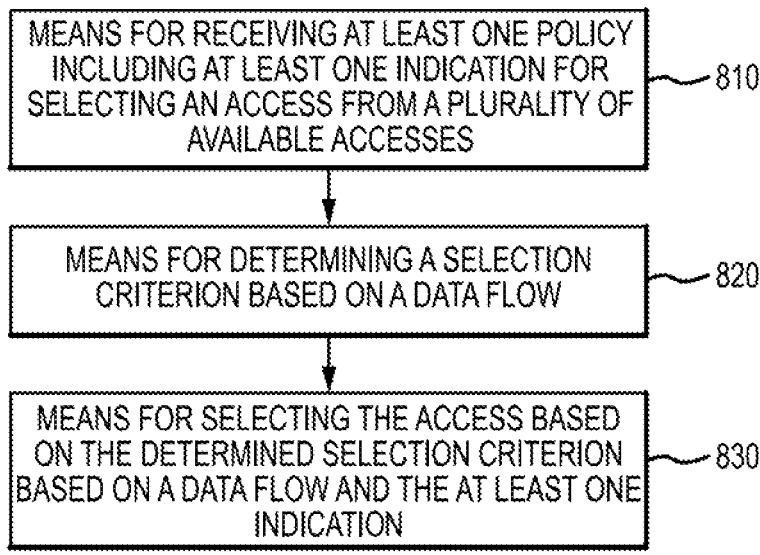
FIG. 8 illustrates a second example device for allocating data flows based on selection criteria.

FIG. 8 illustrates a second example of a device 800 for allocating data flows based, for example in part on selection criteria. In one aspect, the device 800 is implemented by at least one processor including one or more modules configured to provide different aspects of allocating data flows based on selection criteria as described herein in blocks 810, 820 and 830. Block 810 illustrates the means for receiving at least one policy including at least one indication for selecting an access from a plurality of available accesses. Block 820 illustrates the means for determining a selection criterion based on a data flow. Block 830 illustrates the means for selecting the access based on the determined selection criterion and the at least one indication.

For example, each module includes hardware, firmware, software, or any combination thereof. In one aspect, the device 800 is also implemented by at least one memory in communication with the at least one processor.

Figure 9:
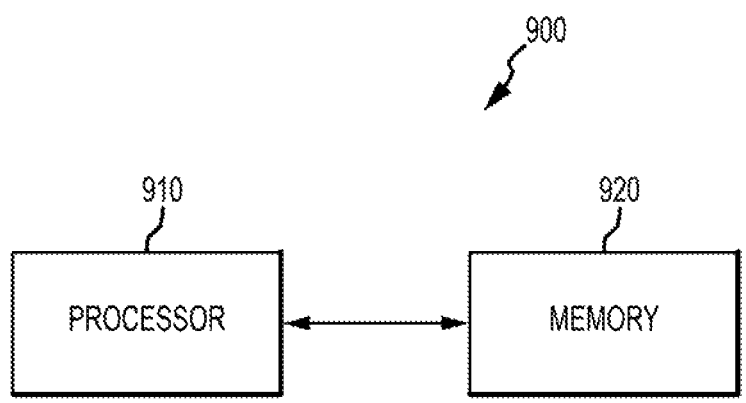
FIG. 9 illustrates an example device including a processor in communication with a memory for executing the processes for allocating data flows based on selection criteria.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 including a processor 910 in communication with a memory 920 for executing the processes for allocating data flows based for example in part on selection criteria. In one example, the device 900 is used to implement the algorithm illustrated in FIGS. 5 and 7. In one aspect, the memory 920 is located within the processor 910. In another aspect, the memory 920 is external to the processor 910. In one aspect, the processor includes circuitry for implementing or performing the various flow diagrams, logical blocks and/or modules described herein.

One skilled in the art would understand that the steps disclosed in the example flow diagrams in FIGS. 5 and 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted or combined without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit.

Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium is a non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM; ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for allocating a data flow comprising:
receiving, at a user equipment, a plurality of policies each including a data structure comprising a set of nodes that, when applied by the user equipment, cause the user equipment to select an access from two or more available accesses, wherein a flow description node of the set of nodes includes traffic identification data and selection criterion data;
applying, at the user equipment, the traffic identification data of the flow description node from the data structures to traffic of the data flow for determining which one of the policies applies to the data flow;
determining, at the user equipment by processing the selection criterion data of the data structure of the determined policy, a selection criterion based at least in part on the data flow; and
selecting, at the user equipment, the access based at least in part on the selection criterion, wherein the selection criterion comprises a protocol used to carry the data flow and a bandwidth requirement for the data flow specifying either a minimum used bandwidth or a maximum used bandwidth for transporting a file having a defined file size.

2. The method of claim 1 wherein the selection criterion is one of the following: an application generating the data flow, an application name/ID, a role ID, a throughput of the data flow, or a combination thereof.

3. The method of claim 1 wherein the policies include a management object (MO) received from a network entity.

4. The method of claim 3 wherein the network entity is an Access Network Discovery and Selection Function (ANDSF) module.

5. The method of claim 1 wherein the bandwidth requirement for the data flow is based at least in part on an application, usage, and data type.

6. The method of claim 5 wherein the policies comprise a management object (MO) received from an Access Network Discovery and Selection Function (ANDSF) module and the access selected is one of a wireless local area network (WLAN) and a 3GPP service.

7. The method of claim 1 wherein the traffic identification data indicates one or more of:
IP source address, IP destination address, source port, or destination port.

8. The method of claim 1 wherein the selection criterion further comprises: an application generating the data flow and an application name/ID.

9. The method of claim 1 wherein the selection criterion further comprises: an application generating the data flow, a media type, an application name/ID, a role ID, and a throughput of the data flow.

10. An apparatus for allocating a data flow comprising:
means for receiving, at a user equipment, a plurality of policies each including a data structure comprising a set of nodes that, when applied by the user equipment, cause the user equipment to select an access from two or more available accesses, wherein a flow description node of the set of nodes includes traffic identification data and selection criterion data;
means for applying, at the user equipment, the traffic identification data of the flow description node from the data structures to traffic of the data flow for determining which one of the policies applies to the data flow;
means for determining, at the user equipment by processing the selection criterion data of the data structure of the determined policy, a selection criterion based at least in part on the data flow; and
means for selecting, at the user equipment, the access based at least in part on the selection criterion, wherein the selection criterion comprises a protocol used to carry the data flow and a bandwidth requirement for the data flow specifying either a minimum used bandwidth or a maximum used bandwidth for transporting a file having a defined file size.

11. The apparatus of claim 10 wherein the selection criterion is one of the following: an application generating the data flow, a media type, an application name/ID, a role ID, a throughput of the data flow, or a combination thereof.

12. The apparatus of claim 10 wherein the policies include a management object (MO) received from a network entity.

13. The apparatus of claim 12 wherein the network entity is an Access Network Discovery and Selection Function (ANDSF) module.

14. The apparatus of claim 10 wherein the bandwidth requirement for the data flow is based at least in part on an application, usage, and data type.

15. The apparatus of claim 14 wherein the policies comprise a management object (MO) received from an Access Network Discovery and Selection Function (ANDSF) module and the access selected is one of a wireless local area network (WLAN) and a 3GPP service.

16. The apparatus of claim 10 wherein the traffic identification data indicates one or more of:
IP source address, IP destination address, source port, or destination port.

17. A user equipment for allocating a data flow comprising:
a receiver for receiving a plurality of policies each including a data structure comprising a set of nodes that, when applied by the user equipment, cause the user equipment to select an access from two or more available accesses, wherein a flow description node of the set of nodes includes traffic identification data and selection criterion data; and
a processor for:
applying the traffic identification data of the flow description node from the data structures to traffic of the data flow for determining which one of the policies applies to the data flow,
determining, by processing the selection criterion data of the data structure of the determined policy, a selection criterion based at least in part on the data flow, and
selecting the access based at least in part on the selection criterion, wherein the selection criterion comprises a protocol used to carry the data flow and a bandwidth requirement for the data flow specifying either a minimum used bandwidth or a maximum used bandwidth for transporting a file having a defined file size.

18. The user equipment of claim 17 wherein the selection criterion is one of the following: an application generating the data flow, a media type, an application name/ID, a role ID, a throughput of the data flow, or a combination thereof.

19. The user equipment of claim 17 wherein the policies include a management object (MO) received from a network entity.

20. The user equipment of claim 19 wherein the network entity is an Access Network Discovery and Selection Function (ANDSF) module.

21. The user equipment of claim 17 wherein the bandwidth requirement for the data flow is based at least in part on an application, usage, and data type.

22. The user equipment of claim 21 wherein the policies comprise a management object (MO) received from an Access Network Discovery and Selection Function (ANDSF) module and the access selected is one of a wireless local area network (WLAN) and a 3GPP service.

23. A non-transitory computer-readable medium including program code stored thereon, comprising:
program code for receiving, at a user equipment, a plurality of policies each including a data structure comprising a set of nodes that, when applied by the user equipment, cause the user equipment to select an access from two or more available accesses, wherein a flow description node of the set of nodes includes traffic identification data and selection criterion data;
program code for applying, at the user equipment, the traffic identification data of the flow description node from the data structures to traffic of a data flow for determining which one of the policies applies to the data flow;
program code for determining, at the user equipment by processing the selection criterion data of the data structure of the determined policy, a selection criterion based at least in part on the data flow; and
program code for selecting, at the user equipment, the access for the data flow based at least in part on the selection criterion, wherein the selection criterion comprises a protocol used to carry the data flow and a bandwidth requirement for the data flow specifying either a minimum used bandwidth or a maximum used bandwidth for transporting a file having a defined file size.

\* \* \* \* \*